(12) United States Patent
Xu et al.

(10) Patent No.: US 10,752,519 B2
(45) Date of Patent: Aug. 25, 2020

(54) FRESH WATER GENERATOR UTILIZING AIR

(76) Inventors: Hong Xu, Shenzhen (CN); Chi Hung Jimmy Wan, Hong Kong (HK)

( * ) Notice: Subject to any disclaimer, the term of this patent is extended or adjusted under 35 U.S.C. 154(b) by 660 days.

(21) Appl. No.: 13/695,314

(22) PCT Filed: Apr. 29, 2011

(86) PCT No.: PCT/CN2011/073521
§ 371 (c)(1),
(2), (4) Date: Jan. 11, 2013

(87) PCT Pub. No.: WO2011/134426
PCT Pub. Date: Nov. 3, 2011

(65) Prior Publication Data
US 2013/0213865 A1    Aug. 22, 2013

(30) Foreign Application Priority Data

Apr. 30, 2010  (CN) .......................... 2010 1 0165600
Sep. 14, 2010  (CN) ..................... 2010 2 0534318 U

(51) Int. Cl.
*C02F 1/18*    (2006.01)

(52) U.S. Cl.
CPC ...................... *C02F 1/18* (2013.01)

(58) Field of Classification Search
CPC .... C02F 2301/08; C02F 2307/10; C02F 9/00; C02F 9/005
(Continued)

(56) References Cited

U.S. PATENT DOCUMENTS 5,845,504 A * 12/1998 LeBleu ................ B01D 5/0072
62/285
6,755,037 B2 * 6/2004 Engel ........................ E03B 3/28
62/177
(Continued)

FOREIGN PATENT DOCUMENTS

CN    2231572 Y    7/1996
CN    1225715 A    8/1999
(Continued)

OTHER PUBLICATIONS

The State Intellectual Property Office, the P.R. China, International Search Report, dated Aug. 4, 2011, p. 1-6, WIPO.
(Continued)

*Primary Examiner* — Heidi R Kelley
*Assistant Examiner* — Akash K Varma
(74) *Attorney, Agent, or Firm* — Carmichael & Co.

(57) ABSTRACT

A fresh water generator utilizing air (100) comprises a main body bracket (114), a water making system, a water purifying system and a water distributing device (126). Both sides and the rear side of the main body bracket (114) are provided with panels, on which ventilating grilles (116, 132, 134) are provided for sucking and exhausting air. The water making system is arranged inside the main body bracket (114) and particularly comprises a condenser/evaporator unit (118), an exhaust fan (140) and a water collecting tank (120), wherein the water collecting tank (120) is arranged on the main body bracket (114) and positioned at the lower end of the condenser/evaporator unit (118), and the exhaust fan (140) is arranged between the condenser/evaporator unit (118) and the ventilating grates (116, 132, 134). The water purifying system is arranged inside the main body bracket (114) and particularly comprises a pump (122) and a filtration device (192). One end of the pump (122) is connected with the water collecting tank (120) through a pipeline, and
(Continued)

the other end of the pump (122) is connected with the filtration device (192) through a pipeline. The water distributing device (126) is arranged on the main body bracket (114) and connected to a water outlet of the filtration device (192) through a pipeline. The fresh water generator utilizing air (100) only needs one water collecting tank (120), and water is directly delivered to the water distributing device (126) after being filtered without storage and can be used instantly for drinking, which completely solves the problem of pollution and bacterial growth when pure water is stored and use for drinking later.

3 Claims, 15 Drawing Sheets

(58) Field of Classification Search
USPC .................. 210/91, 85, 181, 96.1, 138, 143
See application file for complete search history.

(56) References Cited

U.S. PATENT DOCUMENTS

| | | | | |
|---|---|---|---|---|
| 7,272,947 | B2* | 9/2007 | Anderson | B01D 5/0039 |
| | | | | 62/272 |
| 7,357,001 | B2* | 4/2008 | Yoon | B01D 5/0006 |
| | | | | 62/285 |
| 2005/0139552 | A1* | 6/2005 | Forsberg | E03B 3/28 |
| | | | | 62/635 |
| 2010/0275779 | A1* | 11/2010 | Melikyan | B01D 53/265 |
| | | | | 95/213 |

FOREIGN PATENT DOCUMENTS

| | | | |
|---|---|---|---|
| CN | 2523331 | Y | 12/2002 |
| CN | 2654004 | Y | 11/2004 |
| CN | 1698505 | A | 11/2005 |
| CN | 201019538 | Y | 12/2006 |
| CN | 101591927 | A | 12/2009 |
| CN | 101812857 | A | 8/2010 |
| CN | 201794108 | U | 4/2011 |
| CN | 201883470 | U | 6/2011 |
| EP | 0597716 | A1 | 5/1994 |
| JP | 6158685 | A | 6/1994 |
| WO | 0116028 | A | 3/2001 |
| WO | 2006049387 | A | 5/2006 |

OTHER PUBLICATIONS

The State Intellectual Property Office, The P.R. China (SIPO), First Search Report for Chinese patent application CN201010165600.5, dated Dec. 7, 2010, pp. 1-2, SIPO.

The State Intellectual Property Office, The P.R. China (SIPO), Supplemental Search Report for Chinese patent application CN201010165600.5, dated Apr. 15, 2013, pp. 1 of 1, SIPO.

* cited by examiner

FRESH WATER GENERATOR UTILIZING AIR

REFERENCE TO PRIOR APPLICATION

This invention claims the benefits of priorities of Chinese Patent Application No. 201010165600.5 titled "ATMOSPHERIC WATER GENERATOR", filed with the Chinese State Intellectual Property Office on Apr. 30, 2010 and Chinese Patent Application No. 201020534318.5 titled "ATMOSPHERIC WATER GENERATOR", filed with the Chinese State Intellectual Property Office on Sep. 14, 2010, a PCT application thereon being filed on Apr. 29, 2011 with application number PCT/CN2011/073521 claiming priority thereon. The entire disclosures thereof are incorporated herein by reference.

FIELD OF THE INVENTION

The present invention relates to the field of drinking water treatment systems, in particular, to an atmospheric water generator.

BACKGROUND OF THE INVENTION

Generally, drinking water is required to be highly purified so that it will not adversely affect those who drink the water for a long period of time. In most developed countries, tap water has reached the standard for purified water. However, there are still many poorer regions in the world with relatively high prevalence rate and mortality rate due to the pollution of the water source, for example, pollutions caused by infectious germs, chemicals, the animal waste, heavy metals and the like.

When the water source at the upper reaches of the river has been polluted by various pollution sources such as dumped waste, industrial emissions, contaminants released to the river as a result of soil erosion, and so on, the polluted water contains various chemicals, infectious viruses and bacteria which may cause various deadly diseases or severe diseases. Long-term drinking of polluted water can cause adverse affects on the human body. Therefore, as a general requirement, the water for drinking should be treated before being supplied for human consumption.

All pollutants contained in the water can be effectively removed by existing water treatment technology. However, the purified water filtered by the water filtration system is generally stored in a water storage tank from which water is extracted for drinking. The purified water can become polluted by airborne pollutants or by other environmental factors while being stored.

SUMMARY OF THE INVENTION

In view of this, the present invention provides an atmospheric water generator to avoid pollutions to storage water In order to achieve the above objective, the present invention provides the following technical solutions.

An atmospheric water generator according to the present invention may be characterized as including:

a main body bracket, two side panels and a back panel, the said panels are equipped with air grilles for air intake and exhaust;

a water making system, being positioned inside the main body bracket and comprising a condenser/evaporator unit, a suction fan and a water collecting tank, wherein the water collecting tank is positioned inside the main body bracket- and under the condenser/evaporator unit, and the suction fan is positioned between the condenser/evaporator unit and the air grilles;

a water purifying system, being positioned within the main body bracket and comprising a water pump and a filtration device, wherein one end of the water pump is connected to the water collecting tank via the first pipeline, and the other end of the water pump is connected to the filtration device via the second pipeline; and a water distributing device, being positioned within the main body bracket and connected to a water outlet of the filtration device via the third pipeline.

Preferably, in the atmospheric water generator, the filtration device includes a plurality of filters connected in series.

Preferably, in the atmospheric water generator, two suction fans are respectively arranged between the condenser/evaporator unit and the air grille at a left side of the main body bracket, and between the condenser/evaporator unit and the air grille at a right side of the main body bracket.

Preferably, the atmospheric water generator further includes a removable air filter positioned on the outside the condenser/evaporator unit.

Preferably, in the atmospheric water generator, the water collecting tank is detachably positioned on the main body bracket.

Preferably, in the atmospheric water generator, the bottom portion of the water collecting tank is provided with a groove which can receive the water pump, and the water pump is positioned in the space formed by the groove of the water collecting tank and the main body bracket.

Preferably, in the atmospheric water generator, a handle is provided on the water collecting tank to facilitate the moving of the water collecting tank.

Preferably, the atmospheric water generator further includes a compressor positioned in the main body bracket and connected to the condenser/evaporator unit.

Preferably, in the atmospheric water generator, the filtration device includes a filter bracket positioned on the main body bracket, and a plurality of filters connected in series and positioned on the filter bracket.

Preferably, in the atmospheric water generator, the filter bracket provides—a plurality of—bases whereby the filters can be held in position;

each of the said filter seats is provided, on the inner wall, with at least one protrusion; and each of the filters is provided with corresponding feature whereby the protrusion(s) on the said filter base can be engaged.

Preferably, in the atmospheric water generator, the filter seat has two protrusions spaced at an angle of 180 degree.

Preferably, in the atmospheric water generator, the water inlet on the filter seat, the filter, and the water outlet on the filter seatwill form a sealed water passage.

Preferably, in the atmospheric water generator, the filter seats are connected in series by connecting the water outlet of one seat to the water inlet of the next.

Preferably, the atmospheric water generator further includes a purified water heating system provided in the main body bracket.

Preferably, in the atmospheric water generator, the water heating system includes:

a heating device provided on the main body bracket; and a heating pot, being provided with the heating device and connected via a pipeline to the water outlet of the said filtration device or to the water dispensingoutlet of the said water distributing device.

Preferably, in the atmospheric water generator, the heating pot is located under the water dispensing outlet of the water distributing device.

Preferably, in the atmospheric water generator, the water distributing device is provided with two water dispensing outlets, that is, a room temperature water dispensing outlet and a dispensing outlet for water to be heated, and the heating pot is connected to the dispensing outlet for the water to be heated.

Preferably, the atmospheric water generator further includes a valve, being mounted at a top portion of the heating pot and connected via a pipeline to the water outlet of the filtration device or to the water dispensing outlet of the water distributing device.

Preferably, in the atmospheric water generator, the purified water heating system further includes a first detecting device, wherein in the case that the first detecting device detects that the heating pot is placed on the heating device, the valve is controlled to open, allowing dispensing of water into the pot; otherwise the valve is in a closed state.

Preferably, in the atmospheric water generator, the purified water heating system further comprises a second detecting device and a display device, wherein in the case that the first detecting device detects that the heating pot is placed on the heating device, the heating device is controlled to start; and in the case that the second detecting device detects that the water in the heating pot reaches a preset temperature, the heating device is controlled to stop, and the display device displays an alarm signal.

Preferably, in the atmospheric water generator, the display device includes two light-emitting diodes, wherein in the case that the water in the heating pot is in a heated state, a first light-emitting diode is turned on, and in the case that the water in the heating pot reaches the preset temperature, a second light-emitting diode is turned on.

Preferably, in the atmospheric water generator, the heating device is an electromagnetic heating device or a resistive heating device.

Preferably, the atmospheric water generator further includes a rapid heating device connected via pipeline to the water outlet of the said filtration device or to the water dispensing outlet of the water distributing device.

Preferably, in the atmospheric water generator, the rapid heating device is a ceramic type heating device or a quartz tube type heating device.

Preferably, the atmospheric water generator further includes wheels at the bottom portion of the main body bracket.

Preferably, the atmospheric water generator further includes a third detecting device, wherein in the case that the third detecting device detects that an impurity content of the water in the water collecting tank exceeds a preset value, the atmospheric water generator will stop dispensing water.

Preferably, the atmospheric water generator further includes a recirculation pipeline which connects the pipeline between the water distributing device and the filtration device with the water collecting tank, wherein an electromagnetic switching valve is provided on the recirculation pipeline, and in the case that the water distributing device is started, the electromagnetic switching valve is in a closed state.

Preferably, the atmospheric water generator further includes a controller for timing control of starting and stopping the water pump.

Preferably, the atmospheric water generator further includes a three-way connector, wherein one water outlet of the three-way pipe is connected to the water distributing device via a pipeline, and the other two water outlets of the three-way pipe are connected to the said third pipeline and the recirculation pipeline respectively.

Preferably, the atmospheric water generator further includes a waste water collector provided underneath the water distributing device.

Preferably, in the atmospheric water generator, the waste collector is connected to the water collecting tank via a pipeline.

It can be seen from the above technical solutions, in the atmospheric water generator according to the present invention, the suction fan is started to suck the ambient air into the atmospheric water generator, and when the air flowing through the condenser/evaporator unit, the moisture in the air is condensed to drops of water on the surface of the evaporator due to the condensing effect of the evaporator, and the drops of water flow into the water collecting tank along the outer wall of the evaporator. The water in the water collecting tank is conveyed into the filtration device by the water pump to be purified into purified water, and the purified water is conveyed into the water distributing device and is then outputted for drinking from the water dispensing oulet. The present application makes improvements to the prior art, where two water tanks are needed, and the purified water has to be stored in a water storage tank and then is conveyed, from the water storage tank to the water dispensing outlet for drinking, in contrast, according to the present invention, only one water tank (i.e., the water collecting tank) is needed, and the filtered water, without being stored, is conveyed directly to the water distributing device for drinking directly, which completely solves the problems of the pollution and the bacteria-breeding of the purified water while being stored.

BRIEF DESCRIPTION OF THE DRAWINGS

In order to illustrate more clearly the embodiments of the present invention or the technical solution in the prior art, drawings referring to the embodiments or the prior art will be briefly described hereinafter. As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the claims.

DETAILED DESCRIPTION

The present invention provides an atmospheric water generator to avoid secondary pollutions to the water while being stored caused by environmental factors or other factors.

The technical solutions in the embodiments of the present invention will be described clearly and completely hereinafter in conjunction with the drawings in the embodiments of the present invention. Apparently, the described embodiments are only a part of the embodiments of the present invention, rather than all embodiments. As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the claims.

Figure 1:
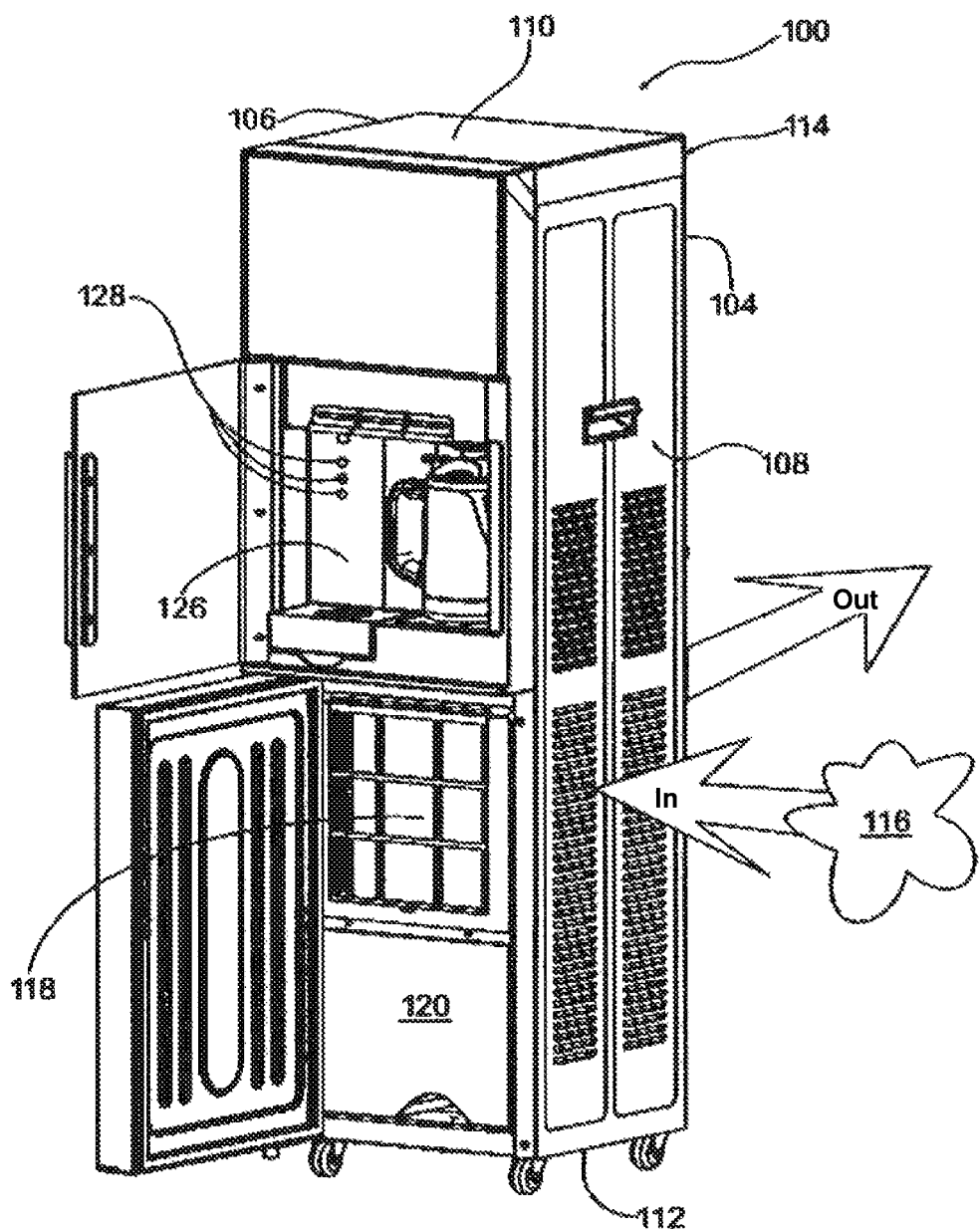
FIG. 1 is a structural schematics of an atmospheric water generator according to an embodiment of the present invention.

Reference may be made to FIG. 1 which is a structural schematics of an atmospheric water generator according to an embodiment of the present invention.

Reference numerals in FIG. 1 are as follows:

| | |
|---|---|
| 100 atmospheric water generator, | 102 front view of the bracket, |
| 104 back view of the bracket, | 106 left view of the bracket, |
| 108 right view of the bracket, | 110 top portion of the bracket, |
| 112 bottom portion of the bracket, | 114 main body bracket, |
| 116 first air intake grille, | 118 condenser/evaporator unit, |
| 120 water collecting tank, and | 126 water distributing device. |

In the atmospheric water generator 100 shown in FIG. 1, both of a middle door and a lower door are open.

The atmospheric water generator 100 according to the present invention includes a main body bracket 114, a water making system, a water purifying system and a water distributing device 126.

Two lateral sides and the back view of the main body bracket 114 are provided with panels, and air grilles are provided on the panels for intaking and exhausting air. In the present embodiment, three air grilles are provided, that is, the first air intake grille 116 and a second air intake grille 132 located at the two lateral sides of the main body bracket, and an air exhaust grille 134 located at the back view of the main body bracket.

The water making system is provided in the main body bracket 114 and includes a condenser/evaporator unit 118, a suction fan 140 and a water collecting tank 120. The water collecting tank 120 is provided on the main body bracket 114 and is located under the condenser/evaporator unit 118. The suction fan 140 is provided between the condenser/evaporator unit and the air grilles. When the air is sucked into the atmospheric water generator 100 through the air grilles by the suction fan 140, the moisture in the air is condensed to drops of water when the air flowing through the condenser/evaporator unit 118 due to the low surface temperature of the evaporator, and the drops of water fall into the water collecting tank 120 from an outer wall of the evaporator.

The water purifying system is provided in the main body bracket 114 and includes a water pump 122 (shown in FIG. 2) and a filtration device 192. One end of the water pump 122 is connected to the water collecting tank 120 via a pipeline, and the other end thereof is connected to the filtration device 192 via a pipeline, such that the water made and then collected in the water collecting tank 120 may be pumped into the filtration device 192 to be filtered and purified, thereby obtaining purified water.

The water distributing device 126 is provided on the main body bracket 114 and is connected to a water outlet of the filtration device 192 via a pipeline, such that the obtained purified water may be outputted for drinking through the water distributing device 126.

In summary, in the atmospheric water generator 100 according to the present invention, the suction fan 140 is started to suck the ambient air into the atmospheric water generator 100, and when the air flowing through the condenser/evaporator unit 118, the moisture in the air is condensed to drops of water on the surface of the evaporator due to the condensing effect of the evaporator, and the drops of water flow into the water collecting tank 120 along the outer wall of the evaporator. The water in the water collecting tank 120 is conveyed into the filtration device 192 by the water pump 122 to be purified into purified water, and the purified water is conveyed into the water distributing device 126 and is then outputted for drinking from the water distributing device 126. The present invention makes improvements to the prior art where two water tanks are needed, and the purified water has to be stored in a water storage tank and then is conveyed from the water storage tank to the water dispensing outlet for drinking. In contrast, according to the present invention, only one water tank (i.e., the water collecting tank 120) is needed, and the filtered water, without being stored, is conveyed directly to the water distributing device 126 for drinking directly, which completely solves the problems of the pollution and the bacteria-breeding of the purified water while being stored.

Further, in order to improve the above technical solution, according to the present invention, two suction fans are respectively arranged between the condenser/evaporator unit 118 and the first air intake grille 116, and between the condenser/evaporator unit 118 and the second air intake grille 132. According to the present invention, by providing two suction fans, more air can be obtained, thus more water can be made. Since the suction fans are provided between the condenser/evaporator unit and the air intake grilles, the ambient air can be sucked onto the condenser/evaporator unit through the air intake grilles quickly for making raw water (raw water refers to water condensed by the evaporator).

Figure 2:
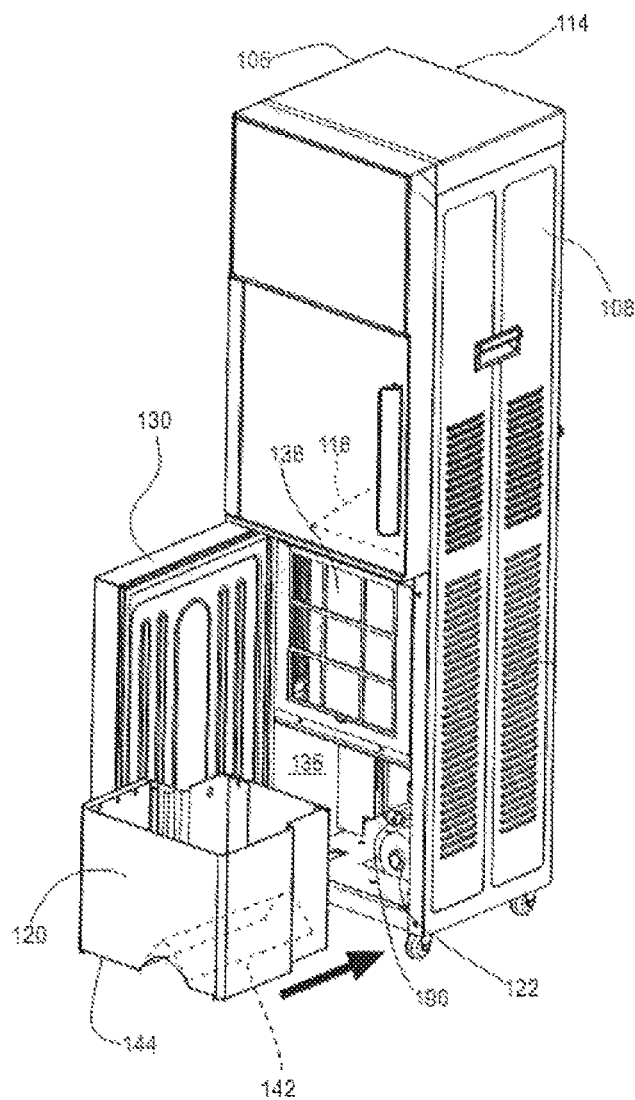
FIG. 2 is a structural schematics of an atmospheric water generator according to an embodiment of the present invention, with the water collecting tank being detached from the atmospheric water generator.

Reference may be made to FIG. 2 which is structural schematics of the atmospheric water generator according to an embodiment of the present invention, with the water collecting tank being detached from the atmospheric water generator.

Reference numerals in FIG. 2 are as follows:

| | | | |
|---|---|---|---|
| 106 | left side of the bracket, | 108 | right side of the bracket, |
| 114 | main body bracket, | 118 | condenser/evaporator unit, |
| 120 | water collecting tank, | 122 | water pump, |
| 130 | lower door, | 132 | second air intake grille, |
| 136 | inside of the atmospheric water generator, | 138 | air filter screen, |
| 142 | groove, | 144 | room temperature water dispensing outlet, and |
| 190 | pipeline. | | |

The lower door 130 is open, and the water collecting tank 120 is detached from the main body bracket 114 for cleaning. The atmospheric water generator 100 is provided at the right side thereof with a second air intake grille 132 and at the left side thereof with a first air intake grille 116. The air intake grilles 116 and 132 allow the ambient air to flow into the inside of the atmospheric water generator 136 freely. An air filter screen 138 for filtering the dust in the air is provided outside the condenser/evaporator unit 118 in the atmospheric water generator 100. Under the action of the suction fan 140, the ambient air passes through the air intake grilles 116 and 132 and the condenser/evaporator unit, and then is exhausted from the back, which ensures that sufficient air is in contact with the evaporator such that maximum amount of the moisture is condensed on the surface of the evaporator.

A bottom portion of the water collecting tank 120 is provided with a groove 142 for receiving the water pump 122, and the water pump is positioned in a space formed by the groove 142 of the water collecting tank 120 and the main body bracket 114. Being provided below the water collecting tank 120, the water pump 122 can easily pump out the raw water in the water collecting tank 120.

Figure 5:
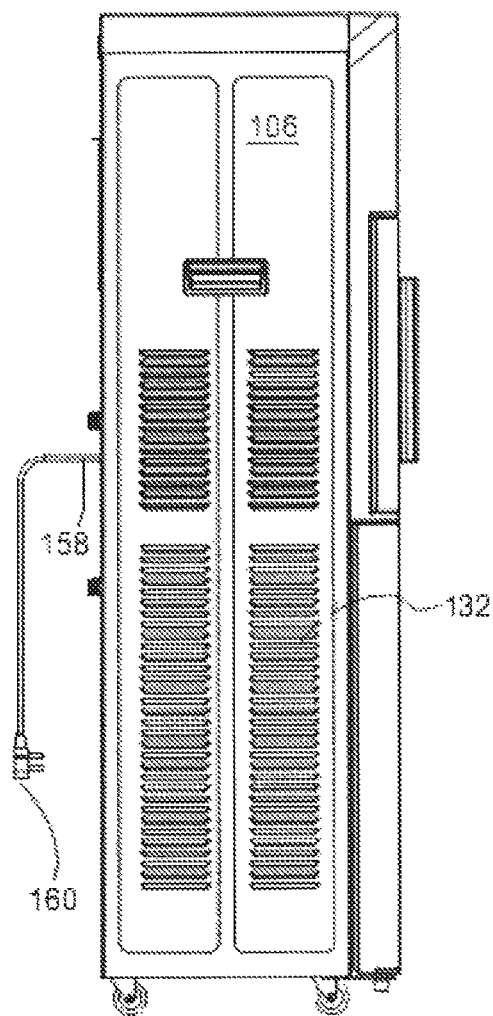
FIG. 5 is a schematics showing the right side view of an atmospheric water generator according to an embodiment, of the present invention.
Figure 6:
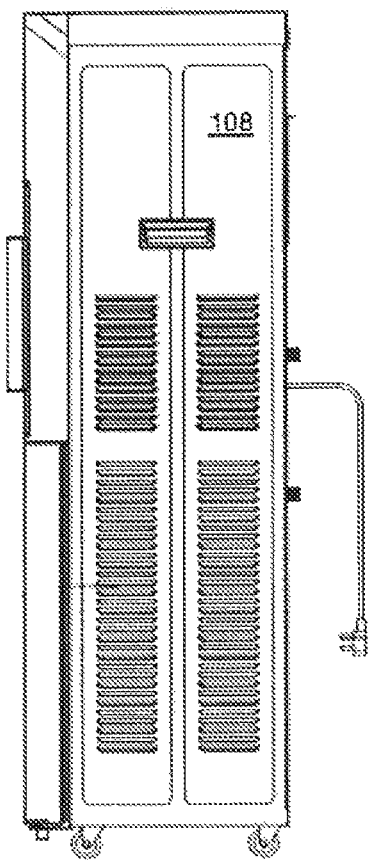
FIG. 6 is a schematics showing the left side view of an atmospheric water generator according to an embodiment of the present invention.

Reference may be made to FIGS. 5 and 6, FIG. 5 is a schematics showing a right side of an atmospheric water generator according to an embodiment of the present invention, and FIG. 6 is a schematics showing a left side of an atmospheric water generator according to an embodiment of the present invention.

Reference numerals in the Figures are as follows:

| | | | | | |
|---|---|---|---|---|---|
| 106 | left side of the bracket, | 108 | right side of the bracket, | 132 | second air intake grille, |
| 158 | power cord, | 160 | plug. | | |

The system in the present invention is connected to an external power supply system via the power cord 138 and the plug 160.

Figure 7:
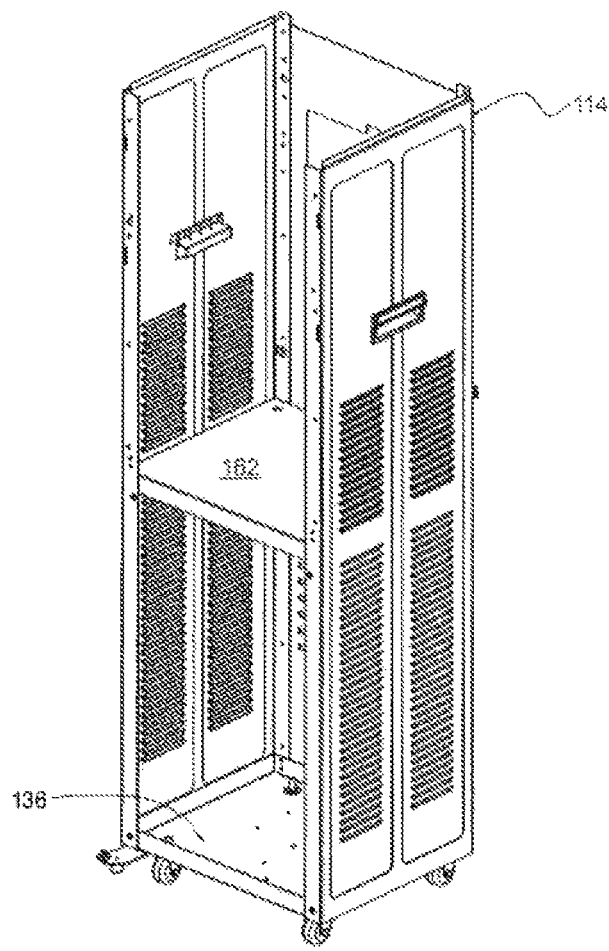
FIG. 7 is a structural schematics of a main body bracket according to an embodiment of the present invention.

Reference may be made to FIG. 7 which is a structural schematics of a main body bracket according to an embodiment of the present invention.

The main body bracket 114 acts as a supporting frame of the atmospheric water generator, and may be made from steel or other materials. The main body bracket 114 may be provided with a transverse partition plate 162 to reinforce the integral structure. As described above, the main body bracket 114 is provided with grilles and passages such that the air can flow into and flow out of the inside of the atmospheric water generator 136.

Figure 3:
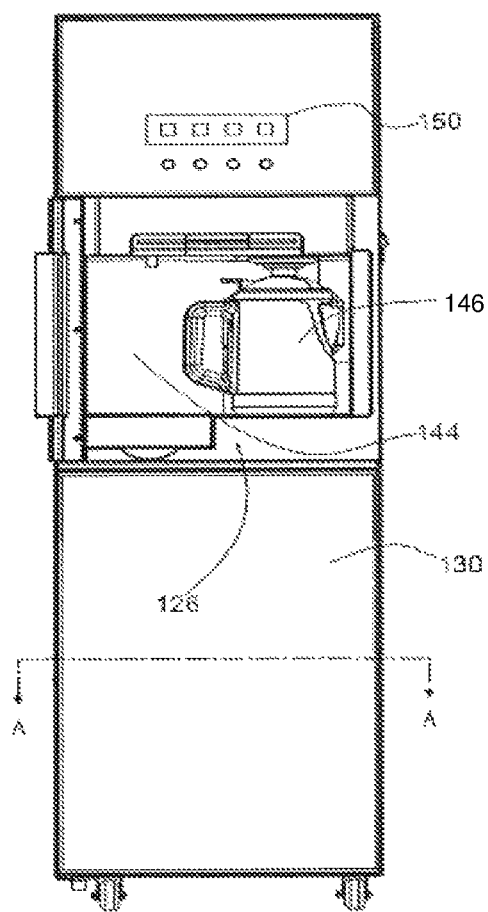
FIG. 3 is a schematics showing the front view of an atmospheric water generator according to an embodiment of the present invention.

Reference may be made to FIG. 3 which is a schematics showing a front side of an atmospheric water generator according to an embodiment of the present invention.

Reference numerals in FIG. 3 are as follows:

| | | | |
|---|---|---|---|
| 126 | water distributing device, | 130 | lower door, |
| 144 | room temperature water dispensing outlet, | 146 | hot water dispensing outlet |
| 150 | control and display panel. | | |

FIG. 3 illustrates the position relationships of the water distributing device 126, the room temperature water dispensing outlet 144 and the hot water dispensing outlet 146. The water distributing device 126 may be hid behind the middle door such that when opening the middle door, a user can use the room temperature water dispensing outlet 144 of the water distributing device 126, and the hot water dispensing outlet 146 on a heating pot. The control and display panel 150 can control the water distributing device 126, and display the temperature and amount of the water via a light-emitting diode or other display means.

Figure 4:
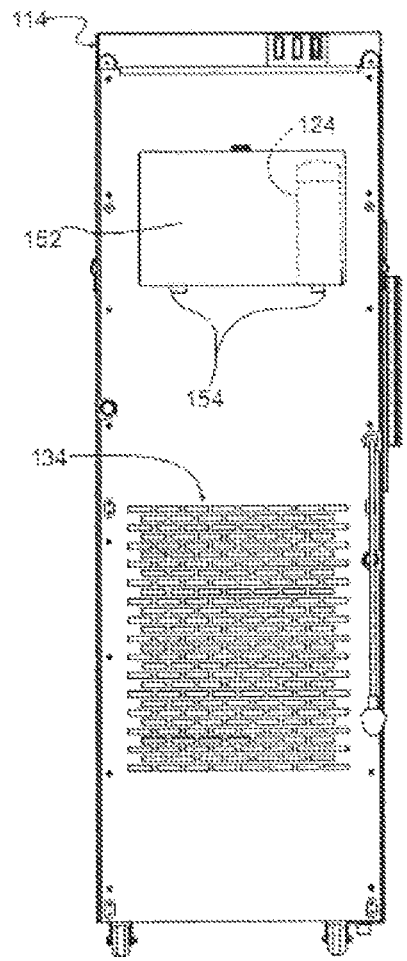
FIG. 4 is a schematics showing the back view of an atmospheric water generator according to an embodiment of the present invention.

Reference may be made to FIG. 4 which is schematics showing a back view of an atmospheric water generator according to an embodiment of the present invention.

Reference numerals in FIG. 4 are as follows:

| | | | | | |
|---|---|---|---|---|---|
| 114 | main body bracket, | 124 | first filter, | 134 | air exhaust grille, |
| 152 | water filter panel, | 154 | position adjusting member. | | |

The air will be exhausted through the air exhaust grille 134 after the moisture in the air is extracted by the atmospheric water generator 100. The atmospheric water generator 100 is provided therein with a first filter 124 arranged behind a water filter panel 152. The water filter panel 152 is provided with hinge(s) 154 connected to the main body bracket 114, such that the first filter 124 can be replaced by opening the water filter panel 152. The water filter panel 152 may also be provided with a latch to securely lock into position with the main body bracket 114. The user may replace the filter according to an indication on the control and display panel 150.

Figure 8:
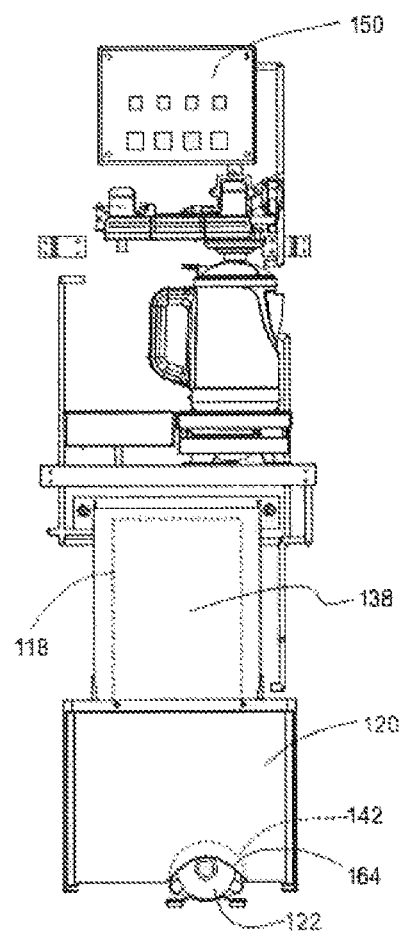
FIG. 8 is a schematics of the inner structure of an atmospheric water generator according to an embodiment of the present invention.
Figure 9:
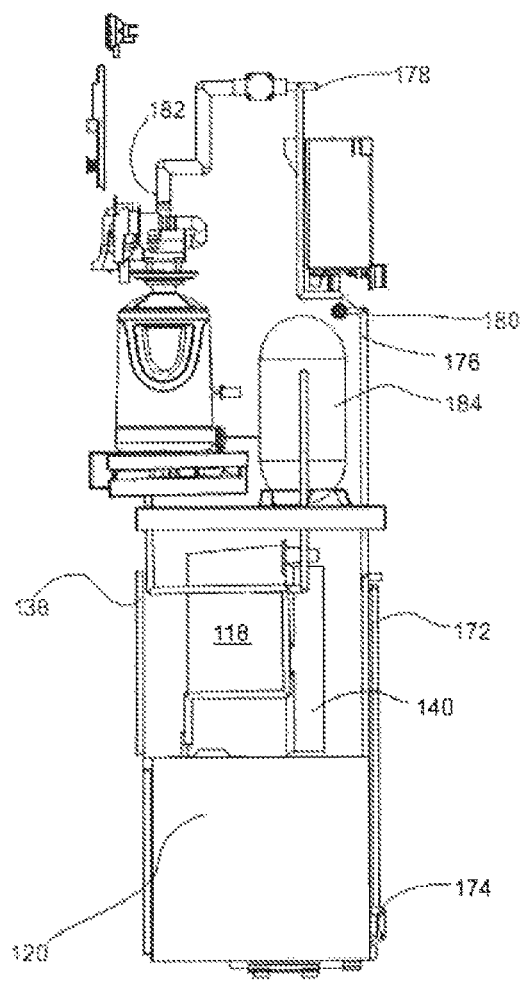
FIG. 9 is the left side view of FIG. 8.
Figure 10:
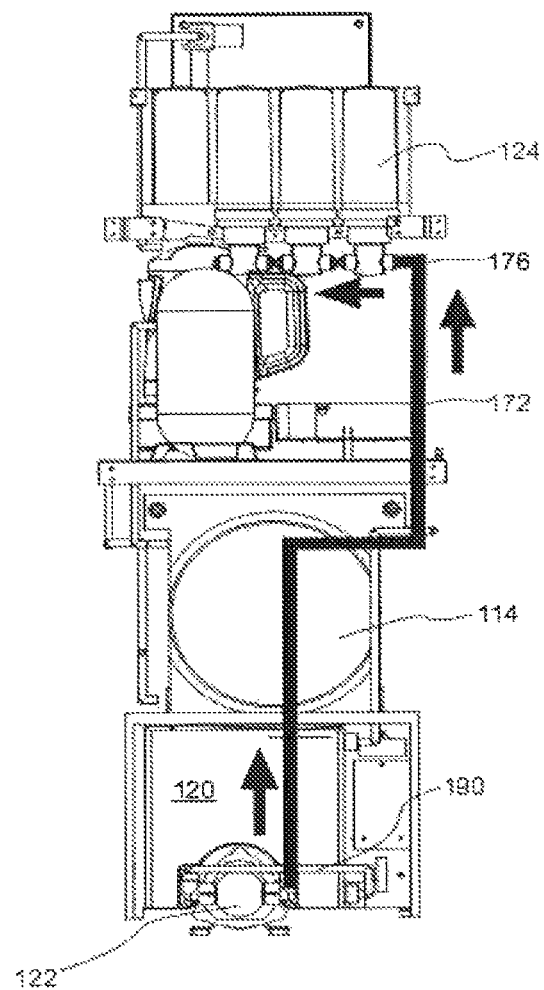
FIG. 10 is the back view of FIG. 8.

Reference may be made to FIGS. 8 to 10, FIG. 8 is a schematics of the inner structure of an atmospheric water generator according to an embodiment of the present invention, FIG. 9 is a left view of FIG. 8, and FIG. 10 is a back view of FIG. 8.

Reference numerals in the Figures are as follows:

| | | | | | |
|---|---|---|---|---|---|
| 114 | main body bracket, | 118 | condenser/ evaporator unit, | 120 | water collecting tank, |
| 122 | water pump, | 124 | first filter, | 138 | air filter screen, |
| 140 | suction fan, | 142 | groove, | 150 | control and display panel, |
| 164 | handle, | 172 | first water pipeline, | 174 | first connector, |
| 176 | second connector, | 178 | second water pipe, | 180 | third connector, |
| 182 | fourth connector, | 184 | compressor, and | 190 | water supply pipe. |

The water collecting tank 120 may be provided with a handle 164 to facilitate the removing of the water collecting tank 120 from the main body bracket 114 to be cleaned. As shown in the figures, an air filter screen 138 is placed conveniently at the air intake of the condenser/evaporator unit 118 (that is, being provided between the condenser/evaporator unit and the suction fan), to facilitate the removing and the cleaning of the air filter screen. In the same figures, other components and arrangements thereof of the atmospheric water generator 100 are also shown.

The atmospheric water generator 100 is provided with the said first water pipeline 172 having a first connector 174 and a second connector 176 at two ends thereof. The water pipe 172 may be any kind of liquid conveying pipes, and may be made from metallic, plastic or other materials. The atmospheric water generator 100 is further provided with the said second water pipeline 178 having a third connector 180 and a fourth connector 182 at two ends thereof. The second water pipeline 178 may be any kind of liquid conveying pipes, and may be made from metallic, plastic or other materials. The atmospheric water generator 100 is further provided with a compressor 184 connected to the condenser/evaporator unit 118. Similar to a conventional refrigeration apparatus, the compressor in operation can also lower the surface temperature of the evaporator 118. The ambient air is sucked into the main body bracket 114 by the suction fan being started, flows through the air filter screen 138 and the condenser/evaporator unit 118, and eventually is exhausted out of the main body bracket 114.

One end of the first water pipeline 172 is connected to the water pump 122 via the first connector 174, and the other end thereof is connected to the filtration device via the second connector 176, and the above connection relationship is indicated by the bold line in the figure. The system is further provided with a water supply pipe 190, one end of the water supply pipe 190 is provided with a removable connector being connected to the water collecting tank 120, and the other end thereof is connected to the water pump 122. The raw water in the water collecting tank 120 can be conveyed to the filtration device to be filtered by the water pump 122. One end of the second water pipe 178 is connected to the filtration device via the third connector 180, and the other end thereof is connected to the water distributing device via the fourth connector 182.

Figure 11:
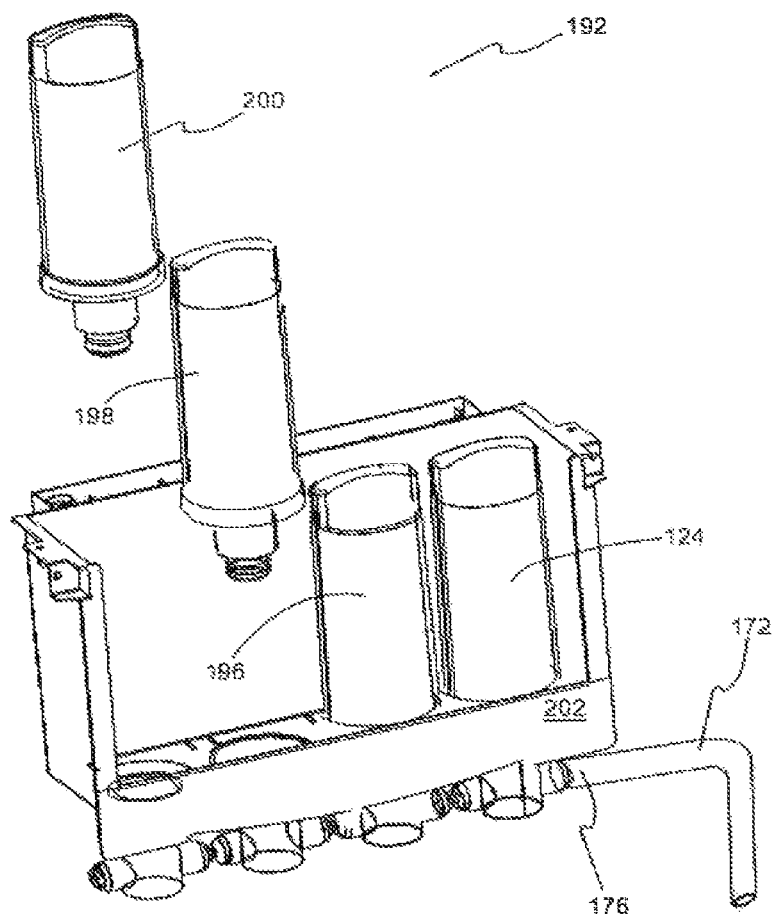
FIG. 11 is a structural schematics of a filtration device according to an embodiment of the present invention.
Figure 12:
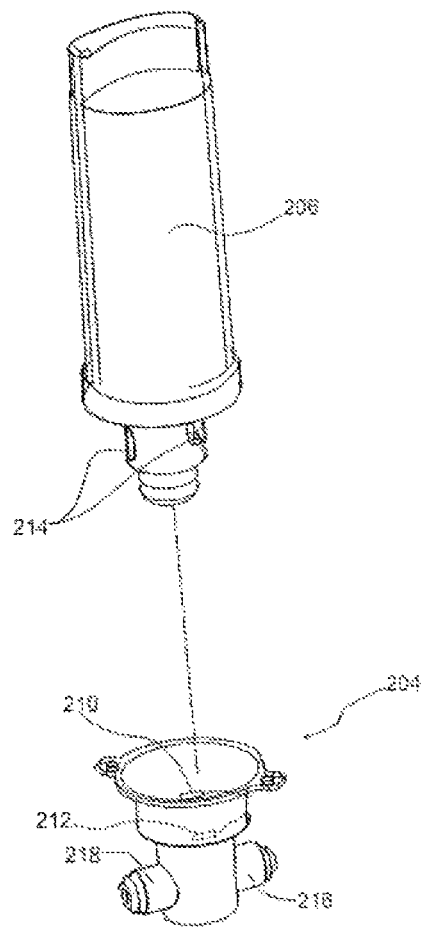
FIG. 12 is a structural schematics of the filters and the seats according to an embodiment of the present invention.
Figure 13:
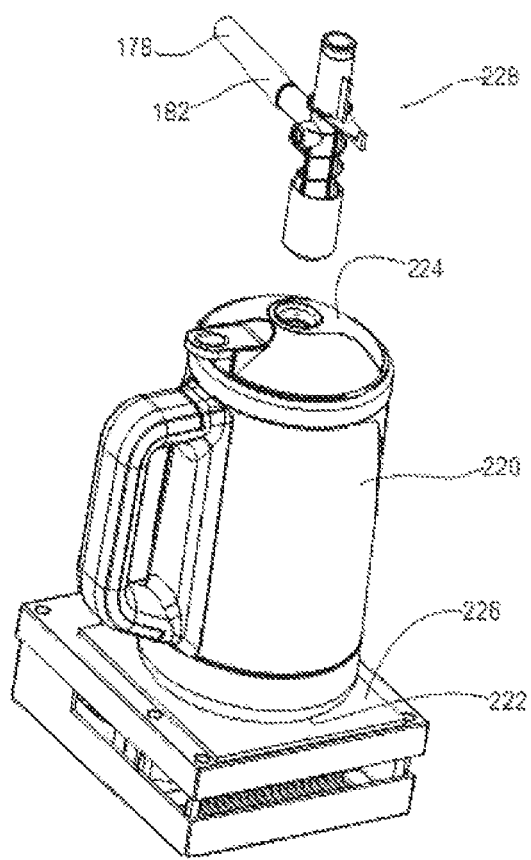
FIG. 13 is a structural schematics of a hot water system according to an embodiment of the present invention.

Reference may be made to FIGS. 11 and 12, FIG. 12 is a structural schematics of a filter and a seat thereof according to an embodiment of the present invention, and FIG. 13 is a structural schematics of a hot water system according to an embodiment of the present invention.

Reference numerals in the Figures are as follows:

| 124 | first filter, | 172 | first water pipe, | 176 | second connector, |
|---|---|---|---|---|---|
| 192 | filtration device, | 196 | second filter, | 198 | third filter, |
| 200 | fourth filter, | 202 | filter bracket, | 204 | filter seat, |
| 206 | filter, | 210 | first protrusion, | 212 | second protrusion, |
| 214 | locking recess, | 216 | water inlet, and | 218 | water outlet. |

The filtration device 192 includes a filter bracket 202 and a plurality of filters connected in series and provided on the filter bracket 202. The filter bracket 202 is provided on the main body bracket 114, and the plurality of filters connected in series are mounted on the filter bracket 202. In the present embodiment, there are four filters, that is, the first filter 124, the second filter 196, the third filter 198 and the fourth filter 200 connected in series. The more the number of the filters are connected in series, the more complete the purification process is.

The filter may be made from a single material or multiple materials, for example, plastic, resin, mineral, activated carbon, a film made from a plastic, and the like. Different filter materials may be selected to achieve different functions. The filter may be selected according to the impurities contained in the atmosphere.

The filter seat 204 is configured to support a replaceable filter 206 and is provided on a filter bracket 202. An inner wall of the filter seat 204 is provided with a protrusion, and the filter is provided with a locking recess 214 corresponding to the protrusion. When assembling the filter, rotate the filter 206 to engage the locking recess 闩 with the protrusion, thereby locking the filter 206 tightly on the filter seat 204. In the present invention, two protrusions spaced at an angle of 180 degree are preferably provided, that is, the first protrusion 210 and the second protrusion 212, and accordingly, there are two locking recesses.

The water flows into the filter 206 through a water inlet 216 and is discharged through a water outlet 218. Each of the other filters is also connected to the corresponding filter seat 204 in the same way. The plurality of filter seats are connected in series by connecting the water outlet of one seat to the water inlet of the next. Water enters from the water inlet of the first filter and is discharged out of the water outlet of the last filter after being filtered by the plurality of filters.

In order to provide hot water for drinking, the present invention further includes a purified water heating system provided within the main body bracket. The purified water heating system includes a heating device provided on the main body bracket and a heating pot provided on the heating device. The heating pot is connected to the water outlet of the filtration device via a pipeline or the water dispensing outlet of the water distributing device, such that the purified water may be fed into the heating pot and be heated by the heating device. The heating device may be an electromagnetic heating device or a resistive heating device.

Preferably, the heating pot is located under the water dispensing outlet of the water distributing device such that the purified water can flow into the heating pot under gravity.

In a case that the room temperature purified water is fed into the heating pot via the water distributing device, it requires that the water distributing device is provided with two water dispensing outlets, that is, a room temperature water dispensing outlet and a dispensing outlet for the water to be heated. The heating pot is connected to the dispensing outlet for the water to be heated via a pipeline. Thereby it can supply people not only with room temperature water but also with hot water.

Reference may be made to FIG. 13 which is a structural schematics of a hot water system according to an embodiment of the present invention.

Reference numerals in the Figure are as follows:

| 178 | second water pipe, | 182 | fourth connector, | 220 | heating pot, |
|---|---|---|---|---|---|
| 222 | seat, | 224 | top portion, | 226 | heating device, and |
| 228 | valve. | | | | |

The heating pot 220 includes a seat 222 and a top portion 224. The seat 222 may be made from metal, such as copper, steel, iron, aluminum or other metals or alloys, and may be heated by the heating device 226. Generally, the heating pot 220 is placed on the heating device 226, and the water in the heating pot 220 will be heated. A valve 228 is provided on the top portion 224 of the heating pot 220, and when the valve 228 is open, the purified water can enter the heating pot 220. The valve 228 may also be connected to the second water pipe 178 directly or indirectly (the valve 228 is connected to the water outlet of the filtration device or the water dispensing outlet of the water distributing device via a pipeline) to receive the purified water discharged from the filters.

Preferably, the purified water heating system according to the present invention further includes a first detecting device. When the first detecting device detects that the heating pot 220 is placed on the heating device 226, the valve 228 is controlled to open, otherwise the valve 228 is closed, thus when the heating pot is removed, the valve is closed, which may prevent the purified water from spilling out.

Preferably, the purified water heating system according to the present invention further includes a second detecting device and a display device. When the first detecting device detects that the heating pot 220 is placed on the heating device 226, the heating device 226 is controlled to start; and when the second detecting device detects that the water in the heating pot 20 reaches a preset temperature, the heating device 226 is controlled to stop, and the display device displays an alarm signal. The display device includes two light-emitting diodes, when the water in the heating pot is in a heated state, a first light-emitting diode is on; and when the water in the heating pot reaches the preset temperature, a second light-emitting diode is on. The preset temperature can be preset by the user and may be set according to different requirements to the water temperature. Generally, the preset temperature is set as 100 centigrade, which is the temperature of the water in a boiled state.

Preferably, the present invention further includes a third detecting device. When the third detecting device detects that the impurity content of the water in the water collecting tank exceeds a preset value, the atmospheric water generator is stopped. The preset value is a concentration value of the water preset by the user. A large amount of sand may be deposited in the water collecting tank being used for a long time. At this time, the concentration of the water in the water collecting tank becomes large, and when the concentration reaches the preset value, the atmospheric water generator is stopped.

In addition, the present invention further includes a rapid heating device, being connected to the water outlet of the filtration device and the water dispensing outlet of the water distributing device. The rapid heating device may be a ceramic type heating device or a quartz tube type heating device. The purified water can be heated in real time when flowing through the preheated rapid heating device.

In order to facilitate the moving of the atmospheric water generator, the present invention further includes wheels provided at the bottom portion of the main body bracket.

Figure 14:
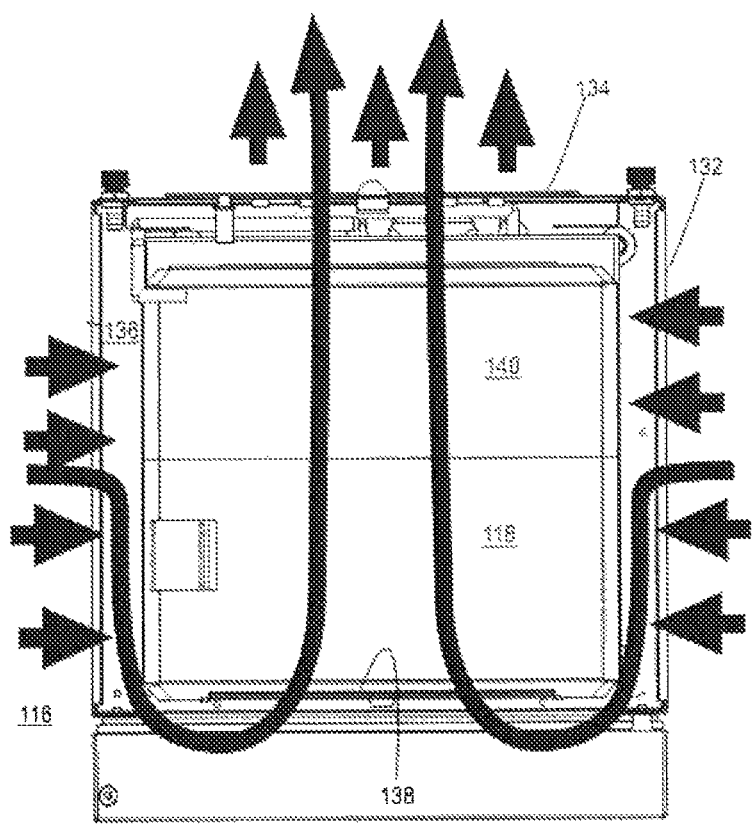
FIG. 14 is a sectional view taken along line A-A of FIG. 3.

Reference may be made to FIG. 14 which is a sectional view taken along line A-A of FIG. 3.

As shown in the figure, the ambient air outside the atmospheric water generator enters the atmospheric water generator through the second air intake grille 132 and the first air intake grille 116 respectively located at two sides of the main body bracket 114, and then is exhausted from the exhaust grille 134 at the back portion. After entering the bracket 114, the air may be guided to the air filter screen 138 to remove the dust in the air, and flows through the condenser/evaporator unit 118 and the suction fan 140 in order, and then is exhausted from the exhaust grille 134 on the main body bracket 114. Through the above process, the moisture in the air can be condensed to drops of water by the evaporator and then is collected in the water collecting tank 120.

Preferably, according to the present invention, the suction fan is provided between the condenser/evaporator unit 118 and the exhaust grille 134 to exhaust the air in the atmospheric water generator. During the exhausting process, air will be supplied into the atmospheric water generator through the second air intake grille 132 and the first air intake grille 116. Certainly, the suction fan may also be provided between the condenser/evaporator unit 118 and the second air intake grille 132, and/or between the condenser/evaporator unit and the first air intake grille 116. Under this situation, the suction fan has to suck the air into the atmospheric water generator, and accordingly, the air in the atmospheric water generator will be exhausted through the exhaust grille 134.

In summary, the first embodiment of the present invention provides an atmospheric water generator including a main body bracket, wherein two lateral sides and the back side of the main body bracket are provided with panels, and air grilles are provided on the panels for the air to flow in and out freely. Two parts are provided in the main body bracket: one is the water making system, and the other is the water purifying system. Both parts are mounted on the main body bracket, and components of the two parts are linked with each other to perform the water making and water purifying functions.

The water making system includes a condenser/evaporator unit, a suction fan and a water collecting tank. When the water making system is started, the surface temperature of the evaporator drops, the air driven by the suction fan flows through the surface of the evaporator and is condensed to drops of water to be collected in the water collecting tank under the condenser/evaporator unit. The water collecting tank is connected to the main body bracket, and can be completely separated from the main body bracket for cleaning.

The water purifying system includes a water pump, a filtration device and a water distributing device. One end of the water pump is connected to the water collecting tank via a water pipe, and the other end thereof is connected to the filtration device via a water pipe. The water outlet of the filtration device is connected to the water dispensing outlet via a water pipe. When a water dispensing outlet switch is turned on, the water pump is started by an internally installed electronic circuit to transport the raw water to the filter, and then the purified water after being filtered is output via the water dispensing outlet for drinking directly.

The second embodiment of the present invention provides an atmospheric water generator with heating function. The purified water heating system includes a heating pot, a heating device which may be an electromagnetic heating device or a resistive heating device, a detecting device, an electronic circuit control system, and a light-emitting diode. The heating pot is arranged under the water dispensing outlet and on top of the heating device. When the purified water enters the heating pot, the heating device is started to heat the purified water in the heating pot to the boiling point or the preset temperature, then under control of a temperature sensor and the electronic circuit, the heating device stops automatically. The operation process is displayed by the light-emitting diodes having different colors provided on the main body bracket.

The third embodiment of the present invention provides an atmospheric water generator which can provides hot water in real time. When the atmospheric water generator is started, the surface temperature of the evaporator drops, the air driven by the suction fan flows through the surface of the evaporator and is condensed to drops of water to be collected in the water collecting tank under the condenser/evaporator unit. The water collecting tank is connected to the main body bracket, and can be completely separated from the main body bracket for cleaning. The water purifying system includes a water pump, filters and a water distributing device. One end of the water pump is connected to the water collecting tank via a water pipe, and the other end thereof is connected to the filter via a water pipe. The water outlet of the filter is connected to a rapid heating device via a water pipe, and the rapid heating device is connected to the water dispensing outlet via a water pipe. When the water dispensing outlet switch is turned on, the water pump is started by an internally installed electronic circuit to transport the water in the water collecting tank to the filtration device for purification, then the purified water after being filtered is transported to the rapid heating device, and then the water is being heated rapidly and is discharged via the water dispensing outlet.

Figure 15:
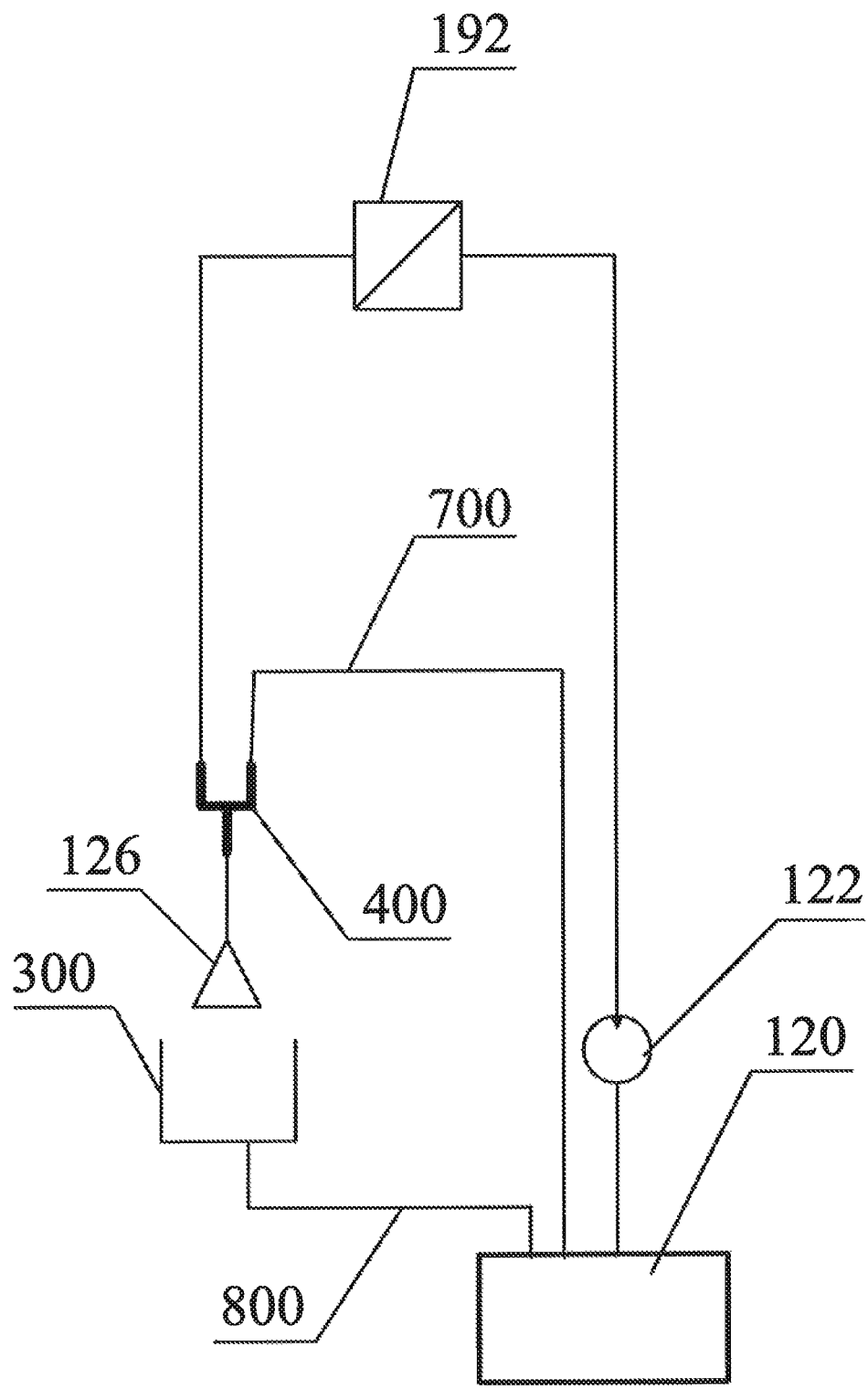
FIG. 15 is a schematics showing pipeline arrangement of an atmospheric water generator according to an embodiment of the present invention.

As shown in FIG. 15, the water collecting tank 120 is connected to the water pump 122 via the first pipeline, the water pump 122 is connected to the filtration device 192 via the second pipeline, and the filtration device 192 is connected to the water distributing device 126 via the third pipeline. Specifically, the present invention includes a recirculation pipeline 700 connecting the third pipeline and the water collecting tank 120.

During the normal operation process, when the water distributing device 126 is started, the water pump 122 is started simultaneously to pump the raw water in the water collecting tank 120 into the filtration device 192 for filtering via the second pipeline, and then the purified water being filtered flows into the water distributing device 126 via the third pipeline and then flows out of the water distributing device 126.

In a case that the atmospheric water generator according to the present invention is not in use for a long time, that is, the water distributing device 126 is kept idle, the water pump 122 may be started to pump the raw water in the water collecting tank 120 into the filtration device 192 for filtering via the second pipeline, and then the purified water being filtered flows into the recirculation pipeline 700 via the third pipeline, and then flows back to the water collecting tank 120, thereby completing a recirculation loop.

Overall, according to the present invention, a bypass, that is, the recirculation pipeline 700, connects the water collecting tank 120 with the third pipeline before it enters into the water distributing device 126, such that when the water pump 122 is started, the raw water is pumped from the water collecting tank 120 to the filtration device 192 via the pipelines, then is transported back to the water collecting tank 120 through the recirculation pipeline 700 without flowing through the water distributing device 126, which may realize the cleaning of the internal pipelines and filtering out all the bacterium by the filtration device 192. Therefore, without starting the water distributing device 126, the recirculation of the water in the water collecting tank 120 and the cleaning of the pipelines of the atmospheric water generator can be realized.

In order to ensure that the purified water will not flow back to the water collecting tank 120 through the recirculation pipeline 700 when the water distributing device 126 is started, an electromagnetic switching valve is provided on the recirculation pipeline 700. When the water distributing device 126 is started, the electromagnetic switching valve is turned off; and only in the case that the water distributing device 126 is not in use and the water pump 122 is started, the electromagnetic switching valve is turned on. That is, only in the case that the water distributing device 126 is in use and the water pump 122 is started, the purified water may flow back to the water collecting tank 120 via the recirculation pipeline 700, such that the purified water cannot flow back to the water collecting tank 120 via the recirculation pipeline 700 when the purified water is in use.

For realizing a pipeline automatic cleaning function, the present invention further includes a controller for timing control of starting and stopping the water pump 122. The controller may set a time interval between two recirculations and the duration of the water pump 122 in operation (that is, the duration for each recirculation), such that the water pump 122 may be started by the controller to perform the automatic recirculation after a preset time interval, so as to clean the pipelines of the atmospheric water generator. The time recording begins when the water pump 122 is started, and when reaching the preset recirculation time, the water pump 122 is stopped by the controller. When the water pump 122 is stopped, the time recorder begins to time again, and when reaching the preset time interval, the water pump 122 is started again, and the recirculation goes on.

The present invention further includes a three-way connector 400, one outlet thereof is connected to the water distributing device 126 via a pipeline, and the other two water outlets thereof are connected to the said third pipeline and the recirculation pipeline 700, respectively. Due to the three-way connector 400, the water distributing device 126, the third pipeline and the recirculation pipeline 700 are connected with one another.

The short pipeline (that is, the pipeline between the three-way connector and the water distributing device 126) between the bypass (the recirculation pipeline 700) and the water distributing device 126 is not flushed in the above recirculation system, thereby the bacterium may breed therein. In view of this, the present invention further includes a waste collector 300 provided under the water distributing device 126. The water distributing device 126 may be started manually by the user such that the purified water is supplied from the system to the water distributing device 126 and is collected by the waste collector 300, and then is piped back to the water collecting tank 120, thereby realizing the manual flushing of this pipeline and the distributing device 126. After flushing the the water distributing device 126 and the pipeline, recirculation, the purified water will contains no bacterium contamination and thus can be drunk safely.

Furthermore, in order to improve the above technical solutions, the waste collector 300 provided by the present invention is connected to the water collecting tank 120 via the fourth pipeline 800. The water collecting tank 120 is located at a very low position of the atmospheric water generator, in relation to the position of the water distributing device 126. This means that the waste collector 300 is located higher than the water collecting tank 120, thus the water collected into the waste collector 300 can flow back to the water collecting tank 120 under gravity via the fourth pipeline 800.

The embodiments of the present invention are described herein in a progressive manner. The description of each of the embodiments is mainly focused on difference thereof from the other embodiments, and references may be made among various embodiments with respect to the same or similar parts thereof.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the claims and is not limited to the embodiments illustrated herein.

What is claimed is:

1. An atmospheric water generator comprising:
   a main body bracket having at least one air intake and at least one air exhaust;
   a water making system provided in the main body bracket and comprising a condenser/evaporator unit, a suction fan and a water collecting tank, the suction fan for drawing air in through the air intake, through condenser/evaporator unit, and out through the air exhaust, the condenser/evaporator unit for condensing moisture in the air into water, and the water collecting tank for collecting water;
   a water purifying system provided in the main body bracket and comprising a water pump and a filtration device, the water pump for pumping water from the water collecting tank through the filtration device to filter the water, thereby producing purified water;
   a water distributing device provided on the main body bracket and connected to a water outlet of the filtration device, the water distributing device operable by a user to start the water pump thereby pumping water from the water collecting tank through the filtration device to filter the water, and producing purified water dispensed directly from the filtration device to the user at the water distributing device and immediately consumable by the user without a storage tank for storing the purified water between the filtration device and the water distributing device; and
   a waste collector provided under the water distributing device for collecting purified water from the water distributing device, the waste collector connected to the water collecting tank thereby to recirculate the purified water collected by the waste collector back to the water collecting tank.

2. The atmospheric water generator according to claim 1, wherein the filtration device comprises a plurality of filters connected in series.

3. The atmospheric water generator according to claim 1, wherein the filtration device comprises a filter bracket securely fastened on the main body bracket, and a plurality of filters connected in series and held in position on the filter bracket.

* * * * *